US007771058B2

United States Patent
Wakita (10) Patent No.: US 7,771,058 B2
(45) Date of Patent: Aug. 10, 2010

(54) PROJECTION DISPLAY APPARATUS

(75) Inventor: Naohide Wakita, Osaka (JP)

(73) Assignee: Panasonic Corporation, Osaka (JP)

( * ) Notice: Subject to any disclaimer, the term of this patent is extended or adjusted under 35 U.S.C. 154(b) by 521 days.

(21) Appl. No.: 11/918,980

(22) PCT Filed: Apr. 21, 2006

(86) PCT No.: PCT/JP2006/308435

§ 371 (c)(1),
(2), (4) Date: Oct. 22, 2007

(87) PCT Pub. No.: WO2006/115210

PCT Pub. Date: Nov. 2, 2006

(65) Prior Publication Data

US 2009/0040472 A1   Feb. 12, 2009

(30) Foreign Application Priority Data

Apr. 22, 2005   (JP)   ............................ 2005-124929

(51) Int. Cl.
G03B 21/00 (2006.01)
G02B 5/132 (2006.01)
G02B 5/134 (2006.01)
G02B 5/136 (2006.01)

(52) U.S. Cl. ...................... 353/122; 359/555; 348/208.1

(58) Field of Classification Search ................... 353/69, 353/122; 348/208.99, 208.1, 208.2, 208.3, 348/208.4, 208.5, 208.6, 208.7, 208.8, 208.9, 348/208.11, 208.12, 208.13, 208.14, 208.15, 348/208.16; 359/555; 345/156

See application file for complete search history.

(56) References Cited

U.S. PATENT DOCUMENTS

| 4,623,930 | A | * | 11/1986 | Oshima et al. | ............ 348/208.5 |
| 6,056,408 | A | * | 5/2000 | Kobayashi | .................. 353/122 |
| 7,284,866 | B2 | * | 10/2007 | Buchmann | .................... 353/42 |
| 7,692,604 | B2 | * | 4/2010 | Yokote et al. | .................. 345/5 |
| 2001/0046035 | A1 | | 11/2001 | Vanderwerf et al. | |
| 2003/0038927 | A1 | * | 2/2003 | Alden | ........................ 353/122 |
| 2003/0038928 | A1 | * | 2/2003 | Alden | ........................ 353/122 |
| 2006/0146015 | A1 | * | 7/2006 | Buchmann | .................. 345/156 |
| 2006/0187421 | A1 | * | 8/2006 | Hattori et al. | ................. 353/69 |

(Continued)

FOREIGN PATENT DOCUMENTS

JP   60-143330   7/1985

(Continued)

Primary Examiner—Seung C Sohn
Assistant Examiner—Bao-Luan Le
(74) Attorney, Agent, or Firm—McDermott Will & Emery LLP (57) ABSTRACT

A portable projection display apparatus (100) of the present invention comprises: a projection device (8) including an image forming means (2) for forming image light and an optical lens system (7) which projects the image light, obtained by the image forming means, toward a projection surface (S1); a swinging detecting means (12) for detecting a relative swinging of the projection device (8) with respect to the projection surface (S1); and a correcting means (11) for correcting a projection direction of the image light with respect to the projection surface (S1) in the projection device (8) in accordance with an output value of the swinging detecting means (12), so as to cancel a movement of the image light in the projection direction that is caused by the swinging.

9 Claims, 7 Drawing Sheets

U.S. PATENT DOCUMENTS

2006/0256298 A1* 11/2006 Knipe ......................... 353/69
2007/0120983 A1* 5/2007 Yamamoto et al. ..... 348/208.99
2009/0079945 A1* 3/2009 Klosowiak et al. ............ 353/69

FOREIGN PATENT DOCUMENTS

| | | |
|---|---|---|
| JP | 7-128633 | 5/1995 |
| JP | 10-333088 | 12/1998 |
| JP | 2001-221641 | 8/2001 |
| JP | 2002-196416 | 7/2002 |
| JP | 2002-261889 | 9/2002 |
| JP | 2002-268141 | 9/2002 |
| JP | 2005-6272 | 1/2005 |
| JP | 2005-505784 | 2/2005 |
| JP | 2005-99680 | 4/2005 |
| JP | 2005-099680 | 4/2005 |

* cited by examiner

PROJECTION DISPLAY APPARATUS

RELATED APPLICATIONS

This application is the U.S. National Phase under 35 U.S.C. §371 of International Application No. PCT/JP2006/308435, filed on Apr. 21, 2006, which in turn claims the benefit of Japanese Application No. 2005-124929, filed on Apr. 22, 2005, the disclosures of which Applications are incorporated by reference herein.

TECHNICAL FIELD

The present invention relates to a projection display apparatus, and particularly to a projection display apparatus modified for portable use.

BACKGROUND ART

It is conventionally common that when a projection display apparatus performs a projection operation, it is placed at a stable location due to restrictions, such as power supply of a light emitting means (light source).

Recently, compact light sources are rapidly spreading, which excel in efficiency, output, power consumption, etc. (for example, a light emitting diode (LED) and a semiconductor laser which can be lighted by a compact power source, such as a lithium secondary battery). Therefore, combined with the commercialization of such compact light sources, ultra-compact projection display apparatuses which can perform projection while being carried are being proposed (see Patent Document 1 for example).

In accordance with a mobile phone described in Patent Document 1, the mobile phone incorporates a projection device which can receive map information through an antenna so as to project the map information as a projected image on a flat surface that is a projection surface (wall, etc.).

Typical examples of electrical apparatuses used while being carried are video cameras and digital cameras. Some of these video cameras and digital cameras have a hand movement preventing function which corrects a recorded image distortion caused due to a hand movement. A technology of detecting the swinging of a camera by an angular velocity sensor attached to a video camera main body and correcting the hand movement based on this detection result has already been developed (see Patent Document 2 for example).

One example of the angular velocity sensor is a quartz crystal tuning fork angular velocity sensor. By applying a voltage to a tuning fork shaped quartz crystal, the quartz crystal tuning fork angular velocity sensor oscillates in one direction due to its piezoelectricity.

When an angular velocity is added to the quartz crystal tuning fork angular velocity sensor in this state, Coriolis force acts, a voltage is generated in a direction orthogonal to the applied voltage, and thus the angular velocity can be detected. Therefore, by attaching the quartz crystal tuning fork angular velocity sensor to the camera main body, the state of the hand movement (angular velocity) of the camera can be detected easily. As a result, feedback control (suitably rotating a lens of a camera optical lens system) can be performed based on a swinging correcting signal corresponding to an output signal of the quartz crystal tuning fork angular velocity sensor, and therefore, the recorded image distortion caused due to the hand movement of the camera can be corrected.

Patent Document 1: Japanese Unexamined Patent Publication 2002-261889

Patent Document 2: Japanese Unexamined Patent Publication 60-143330

DISCLOSURE OF THE INVENTION

Problems to be Solved by the Invention

The present inventor has developed a projection display apparatus which can perform projection while being carried, by using, as a light source, an LED or a semiconductor laser which can be lighted by a compact power source, such as a lithium secondary battery.

However, when the projection display apparatus for portable use performs projection with respect to a fixed projection surface (for example, a fixed wall), the projected image distortion occurs due to the hand movement, and the legibility of image information deteriorates.

Moreover, in a state where the projection surface is not fixed, for example, when the projection device and the projection surface are integrally formed so that the projection surface follows the movement of the projection device, the projected image distortion occurs due to the movement therebetween caused due to the stiffness between the projection device and the projection surface, and similarly, the legibility of the image information deteriorates.

The present invention was made under such circumstances, and an object of the present invention is to provide a portable projection display apparatus which suppress the projected image distortion caused due to relative swinging of the projection device with respect to the projection surface.

Means for Solving the Problems

To solve the above problems, a portable projection display apparatus according to the present invention comprises: a projection device including an image forming means for forming image light and a projection optical lens system which projects the image light, obtained by the image forming means, toward a projection surface; a swinging detecting means for detecting a relative swinging of the projection device with respect to the projection surface; and a correcting means for correcting a projection direction of the image light with respect to the projection surface in the projection device in accordance with an output value of the swinging detecting means, so as to cancel a relative movement of the image light in the projection direction that is caused by the swinging.

With this construction, it is possible to suppress the projected image distortion caused due to the relative swinging of the projection device with respect to the projection surface.

The swinging detecting means may detect the relative swinging of the projection device in a state where the projection surface is fixed.

With this construction, the character information of the projected image is legible even when the projection distance between the portable projection display apparatus (projection device) and the projection surface is extended adequately and the projected image is magnified on a large screen.

One example of the swinging detecting means is an angular velocity sensor which detects an angular velocity of the projection device. For example, a quartz crystal tuning fork angular velocity sensor is used as the angular velocity sensor.

Moreover, the swinging detecting means may detect a relative swinging occurred between the projection device and the projection surface in a state where the projection surface is not fixed.

With this construction, it is possible to suppress the projected image distortion caused due to the swinging between the projection device and the projection surface in a state where the projection surface is not fixed. As a result, the image blurring and the character blurring caused due to the swinging between the projection device and the projection surface are improved, and a clear image quality can be obtained.

The swinging detecting means may include a radiation source which is provided on the projection surface for emitting an energy wave and a sensor which detects the energy wave emitted from the radiation source.

Alternatively, the swinging detecting means may include a radiation source which is stored in the projection device for emitting an energy wave and a sensor which detects the energy wave which is emitted from the radiation source toward the projection surface and is reflected by the projection surface.

Moreover, the projection surface may be provided with a marking which gives a predetermined characteristic to the energy wave reflected by the projection surface based on an interaction between the marking and the energy wave, and this marking can be utilized, for example, for detecting appropriate projection positions of the projection device and the projection surface.

Moreover, the projection display apparatus may further comprises a projection surface on which the image light emitted from the projection device is projected, and as one construction example of this, the projection display apparatus may further comprises a flat screen including the projection surface and a rod-like holding member joined to the screen along one side of the screen, wherein the screen and the projection device may be joined to each other via the holding member.

The projection display apparatus may be constructed such that the holding member is provided with a step portion, and there are a nonuse position of the projection display apparatus where a frame of the projection device fits in the step portion and a use position of the projection display apparatus where the frame is separated from the step portion.

For example, the projection display apparatus may be constructed such that one end of the frame is attached to the holding member, and the frame swings around the end, so that the frame moves between the nonuse position and the use position so as to fit in or be separated from the step portion.

With this construction, when not using the projection display apparatus, the frame swings so as to enter into the step portion, and the frame easily fits in the step portion.

Moreover, when using the projection display apparatus, the frame swings, the frame is separated from the step portion, and an appropriate projection distance is easily set between the frame and the screen. As a result, the image light passing through the openings provided on the flat surface of the frame is projected on the screen.

In a state where the projection surface is not fixed, a focal length between the projection device and the projection surface may be adjustable by detecting, when using the projection display apparatus, a status signal indicating a focus status based on the swinging detecting means.

Moreover, after projection positions of the projection device and the projection surface and a projection distance between the projection device and the projection surface are set such that the projection display apparatus is able to perform projection, the swinging detecting means may start detecting swinging occurred between the projection device and the projection surface.

The projection display apparatus may further comprises a radiation source which is stored in the projection device for emitting an energy wave toward the projection surface and a marking which is provided on the projection surface for giving a predetermined characteristic to the energy wave reflected by the projection surface based on an interaction between the marking and the energy wave, wherein the swinging detecting means may detect a status signal of the marking based on the energy wave to which the predetermined characteristic is given, and projection positions of the projection device and the projection surface may be determined based on the status signal.

With this, by detecting the status signal of the marking thin lines (for example, by detecting whether or not the bar code information of the marking thin lines can be obtained by the bar code reader), it is possible to determine appropriate projection positions of the projection device and the projection surface based on the status signal.

Moreover, the projection display apparatus may further comprises a light emitting means, wherein the image forming means may form the image light based on light emitted from the light emitting means.

With this, a display element, such as a liquid crystal display panel, which does not emit light can be used as the image forming means.

The above object, other objects, features, and advantages of the present invention will be made clear by the following detailed explanation of preferred embodiments with reference to the attached drawings.

Effects of the Invention

In accordance with the present invention, a portable projection display apparatus can be obtained, which suppresses a projected image distortion caused due to relative swinging of a projection device with respect to a projection surface.

EXPLANATION OF REFERENCE NUMBERS

1 light emitting means
1*a* lithium secondary battery
1*b* white LED
2 image forming means
3 collimator lens
4 liquid crystal light valve
5 image memory
6 light valve control circuit
7 projection optical lens system
7*a* projection lens
7*b* total reflection movable mirror
8 projection device 9 correcting means control device
10, 21, 40 frame
11 correcting means
11a swinging correcting signal output circuit
11b two-axis correcting motor
12a, 12b angular velocity sensor
13a, 13b angular velocity sensitive axis
22 holding member
22a cutout region
31 photodiode array
32 infrared LED
36 infrared laser
33 infrared reflection mirror
34 correcting means control device
50a high-pass filter
50b contrast detecting section
50c memory
50d comparing section
50e output section
100, 101, 102, 103 projection display apparatus
S1, S2 screen
P opening
L optical path

BEST MODE FOR CARRYING OUT THE INVENTION

Hereinafter, preferred embodiments of the present invention will be explained with reference to the drawings.

Embodiment 1

Figure 1:
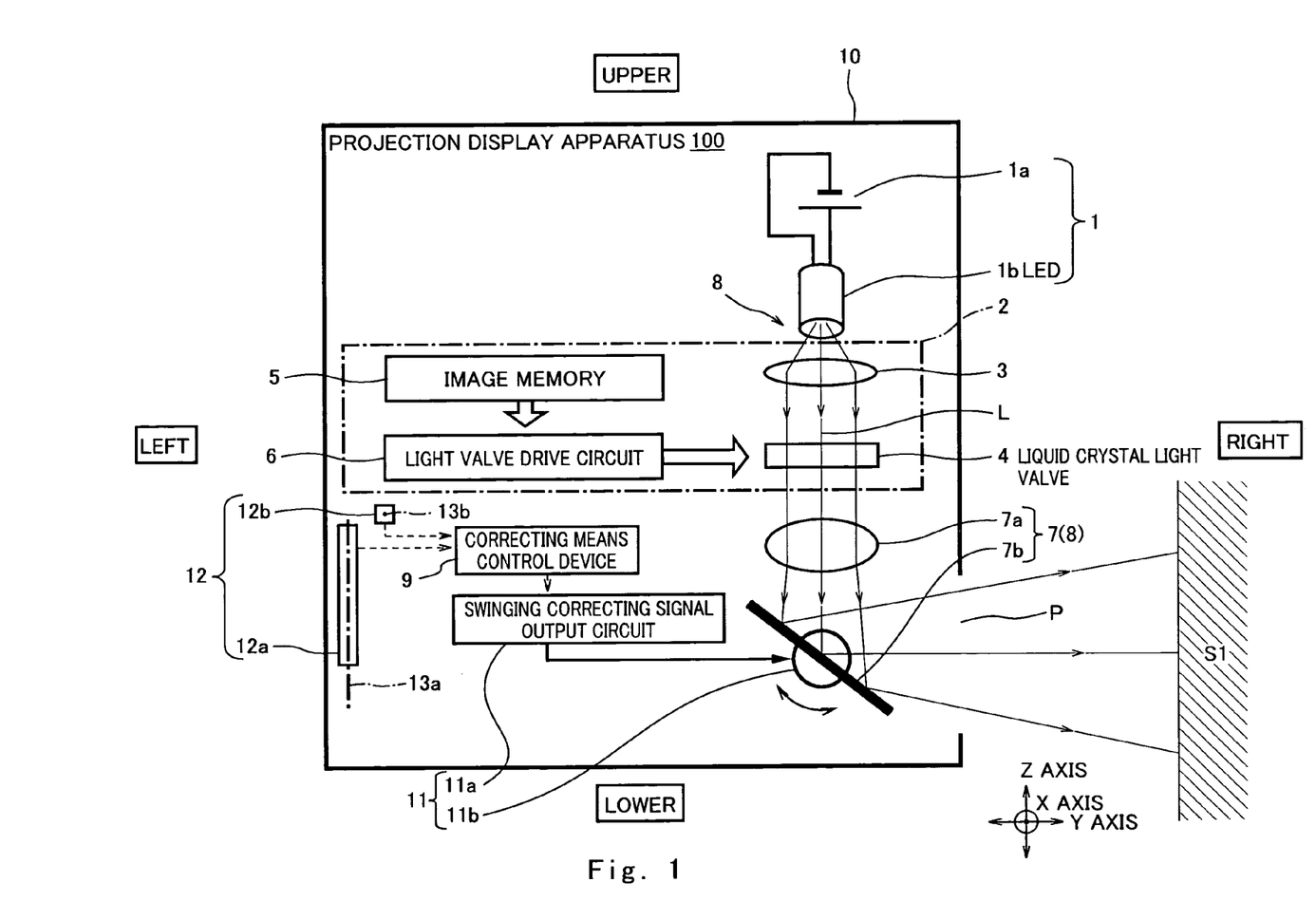
FIG. 1 is a block diagram showing one construction example of a projection display apparatus according to Embodiment 1 of the present invention.

FIG. 1 is a block diagram showing one construction example of a projection display apparatus according to Embodiment 1 of the present invention.

FIG. 1 shows "UPPER", "LOWER", "LEFT" and "RIGHT", however, these are shown just for convenience of explanation of the present specification, and these do not correspond to directions when actually using a projection display apparatus 100. In addition, for convenience of explanation, in FIG. 1, a vertical direction is referred to as a Z-axis direction (tilt direction), a direction perpendicular to the sheet surface of FIG. 1 is referred to as X-axis direction (horizontal direction), and a crosswise direction is referred to as a Y-axis direction (focal length direction) (Same is true in FIGS. 3 and 4.).

The projection display apparatus 100 includes a projection device 8 in which light emitted from a light emitting means 1 illuminates a rear surface of a liquid crystal light valve 4, and light (hereinafter referred to as "image light") constituting an image formed in the liquid crystal light valve 4 is projected on a screen (hereinafter referred to as "screen S1 or screen S2"), including a projection surface, by a projection lens optical system 7.

Moreover, the projection display apparatus 100 includes: a swinging detecting means 12 for detecting the swinging of the projection device 8 in a state where the position of the screen S1 is fixed; a correcting means 11 for correcting a projection direction of the image light toward the screen S1 in the projection device 8 in accordance with an output value of the swinging detecting means 12; and a correcting means control device 9 for appropriately controlling operations of the correcting means 11 based on a detection signal output from the swinging detecting means 12.

These swinging detecting means 12, correcting means 11 and correcting means control device 9 are provided inside a frame 10 which stores the projection device 8.

The projection device 8 includes: the light emitting means 1, which is small in size, for generating light which illuminates the rear surface of the liquid crystal light valve 4; an image forming means 2 for forming suitable image light based on the light emitted from the light emitting means 1; and a projection optical lens system 7 for magnifying the image light obtained by the image forming means 2 and projecting the light toward the screen S1.

The light emitting means 1 includes a lithium secondary battery 1a and a white LED (light source) 1b which can be lighted by power of the lithium secondary battery 1a. Thus, the white LED 1b which excels in the efficiency, the output, the power consumption, etc. realizes the projection of the projection display apparatus 100 while the projection display apparatus 100 is being carried.

The white LED 1b is used herein as a light source. However, the present embodiment is not limited to this, and any light source can be used as long as it excels in the above properties and is small in size, and it may be a semiconductor laser for example. When using the semiconductor laser, it is possible to form a two-dimensional image by modulating the semiconductor laser light source itself at high speed and constructing an optical lens system which scans the semiconductor laser light source.

The image forming means 2 includes: the liquid crystal light valve 4 which forms the image light projected on the screen S1 and is constituted of a transmission type 0.5-inch TFT (Thin Film Transistor) liquid crystal panel; a collimator lens 3 (light-condensing optical lens system) which is located on a side of the rear surface of the liquid crystal light valve 4, and can convert diffusion light, which is emitted from the white LED 1b and diffuses centering around the white LED 1b, into parallel light toward a Z-axis downward direction and causes the parallel light to illuminate the rear surface of the liquid crystal light valve 4; an image memory 5 which is constituted of an EPROM, a flash memory, or the like and records image information; and a light valve control circuit 6 (driver LSI, or the like) which causes the liquid crystal light valve 4 to execute an optical shutter operation and to write a suitable image based on the image information.

The liquid crystal panel is used herein as one example of the light valve (in short, a compact display device capable of recording and deleting the image light in real time). However, the present embodiment is not limited to this, and for example, an element in which minute mirrors are arranged (DMD (trademark); Digital Micromirror Device) may be used.

Moreover, the projection optical lens system 7 includes: a projection lens 7a (actually, a combination of a plurality of spherical or aspherical lens) provided such that a lens optical axis thereof is substantially in parallel with an optical path (traveling path of the center of light beams) L of the image light emitted from the liquid crystal light valve 4; and a total reflection movable mirror 7b which is provided so as to be rotatable around the Z-axis direction and the X-axis direction and so as to tilt at approximately 45 degrees, when viewed from the X-axis direction, with respect to the optical path L of the image light emitted from the projection lens 7a.

The swinging detecting means 12 includes, for example, a pair of quartz crystal tuning fork angular velocity sensors 12a and 12b which are fixed in the vicinity of the projection optical lens system 7 (to be precise, a suitable position on an inner side of the frame 10 in the vicinity of the projection optical lens system 7) and are orthogonal to each other.

Since the screen S1 is provided so as to be in parallel with an X-Z plane, an angular velocity sensitive axis 13a of the angular velocity sensor 12a corresponds to the Z-axis direction (tilt direction of the projected image) of the projected image projected on the screen S1, and the angular velocity sensitive axis 13b of the angular velocity sensor 12b corresponds to the X-axis direction (horizontal direction of the projected image) of the projected image projected on the screen S1. Each of the angular velocity sensors 12a and 12b incorporates various signal processing circuits, such as a filter (not shown) and an amp (not shown). However, these angular velocity sensors 12a and 12b are publicly known, so that detailed explanations thereof are omitted here.

Moreover, the quartz crystal tuning fork angular velocity sensor is used herein as one example of the angular velocity sensors 12a and 12b of the swinging detecting means 12. However, the present embodiment is not limited to this, and for example, a magneto-resistive element capable of detecting the angular velocity may be used. Further, the swinging detecting means 12 is not limited to the angular velocity sensor.

Angular velocity signals for two axes (X-axis and Z-axis) output from the angular velocity sensors 12a and 12b are supplied to the correcting means control device 9, and the angular velocity signals are digitalized by an A/D converter (not shown) incorporated in the correcting means control device 9.

The intensity of the angular velocity signal digitalized by the A/D converter is proportional to the speed of the movement of the projected image in the X-axis direction or the Z-axis direction.

The correcting means control device 9 incorporates a suitable central processing unit (CPU (not shown)) which generates a drive signal for a two-axis correcting motor 11b for causing the total reflection movable mirror 7b of the projection optical lens system 7 to move, to cancel the swinging of the projected image, based on information of the angular velocity detected by the angular velocity sensors 12a and 12b due to the swinging of the projection display apparatus 100.

The correcting means 11 includes: the two-axis correcting motor 11b having a motor axis capable of causing the total reflection movable mirror 7b to rotate around the rotation axis of the X-axis direction of the total reflection movable mirror 7b and the rotation axis of the Z-axis direction of the total reflection movable mirror 7b; and a swinging correcting signal output circuit 11a which receives the drive signal (digital angular velocity signal) output from the correcting means control device 9 and supplies, to the two-axis correcting motor 11b, a correction output voltage corresponding to the drive signal. To be specific, the two-axis correcting motor 11b can cause the total reflection movable mirror 7b to move appropriately and correct the projection direction of the image light toward the screen S1 in the projection device 8. As a result, the movement (to be precise, the movement of the image light in the projection direction corresponding to the X-axis direction and the Z-axis direction) of the projected image due to the swinging of the projection display apparatus 100 (projection device 8) is canceled.

The operation of causing the total reflection movable mirror 7b to move by the two-axis correcting motor 11b is realized by a publicly known two-axis rotating mechanism that is a combination of a suitable gear (not shown) and cam (not shown).

The movement of the projected image on the screen S1 by the swinging in the focal length direction (Y-axis direction) is regarded as negligibly small, so that the correction of the swinging of the projection display apparatus 100 is not performed for this direction.

In the present specification, a control device denotes not only a single control device but also a control device group that is a group of a plurality of control devices which control operations in cooperation with each other. Therefore, in addition to the control of the correction operation of the correcting means 11, the correcting means control device 9 may control the operation of the projection display apparatus 100. Alternatively, a plurality of control devices may be arranged, and the correcting means control device 9 and other control device(s) (light valve control circuit 8 for example) may cooperate with each other so as to control the operation of the projection display apparatus 100.

Next, one example of the operation of the projection display apparatus 100 according to the present embodiment will be described together with its comparative example.

The present inventor has prototyped a ultra-compact projection display apparatus 100 which was similar in size to a cigarette packet. A projection confirming experiment was performed using this prototype, that is, the projection state of the projected image projected on the screen S2 was confirmed in a case where the prototype was turned on while being held in hand and the correction of the movement (hand movement) of the projected image by the swinging detecting means 12 (angular velocity sensors 12a and 12b) and the correcting means 11 was performed and in a case where the correction was not performed (Comparative Example).

As shown by arrows in FIG. 1, when a main power of the projection display apparatus 100 was turned on, the liquid crystal light valve 4 of the image forming means 2 formed the image light based on the light emitted from the light emitting means 1. Meanwhile, the image light emitted from the liquid crystal light valve 4 was magnified by the projection optical lens system 7 (the projection lens 7a and the total reflection movable mirror 7b), and the direction of the image light was changed at approximately 90 degrees by the total reflection movable mirror 7b from the Z-axis downward direction to a Y-axis rightward direction. The image light passed through an opening P of the frame 10 and was projected on the screen S1 located in the Y-axis rightward direction from the frame 10. Thus, the projected image corresponding to the image light was displayed (formed) on the screen S1.

In this state, when the correction of the movement of the projected image was performed by the swinging detecting means 12 and the correcting means 11, the direction of the total reflection movable mirror 7b of the projection optical lens system 7 was changed by the correcting means 11 based on the angular velocity signal output from the swinging detecting means 12. Thus, the projection direction of the image light was appropriately corrected such that the movement of the projected image was canceled. Therefore, even when a projection distance between the projection display apparatus 100 (projection device 8) and the screen S1 was extended to 1 meter, and the projected image was magnified to be about 50 inches, character information of the projected image was legible.

Compared to this case, when the correction of the movement of the projected image was not performed by the swinging detecting means 12 and the correcting means 11 (Comparative Example), the image information became more illegible as the projection distance between the projection display apparatus 100 and the screen S1 increased (that is, as an image region became larger). For example, when the projection distance between the projection display apparatus 100 (projection device 8) and the screen S1 was about 30 cm, the character information of the projected image became illegible.

It is understood from the result of the above experiment that the effect of suppressing the movement of the projected image based on the correction of the movement of the projected image by the swinging detecting means 12 and the correcting means 11 is effectively produced.

Simultaneously, filter pass bands (or cutoff bands) of the angular velocity sensors 12a and 12b was changed, outputs of the angular velocity sensors 12a and 12b were filtered, and the relation between the visibility of the projected image and a frequency component of the swinging was evaluated.

Regarding the swinging of the low frequency component of less than approximately 1 Hz, even if the correction of the movement (hand movement) of the projected image by the swinging detecting means 12 and the correcting means 11 was stopped, observer's eyes could follow such swinging of the low frequency component, and there were no problems regarding the legibility of the character information of the projected image.

Conversely, when the correction of the movement (hand movement) of the projected image by the swinging detecting means 12 and the correcting means 11 was performed with respect to the angular velocity of the low frequency of less than approximately 1 Hz, the correction of the movement of the projected image by the swinging detecting means 12 and the correcting means 11 was performed with respect to the movements of arms and posture of the observer which should have been distinguished from the movement of the projected image, and the projected image became illegible. Therefore, it also became clear that it was desirable that the correction of the movement of the projected image by the swinging detecting means 12 and the correcting means 11 be performed with respect to the angular velocity of at least 1 Hz.

Embodiment 2

Figure 2:
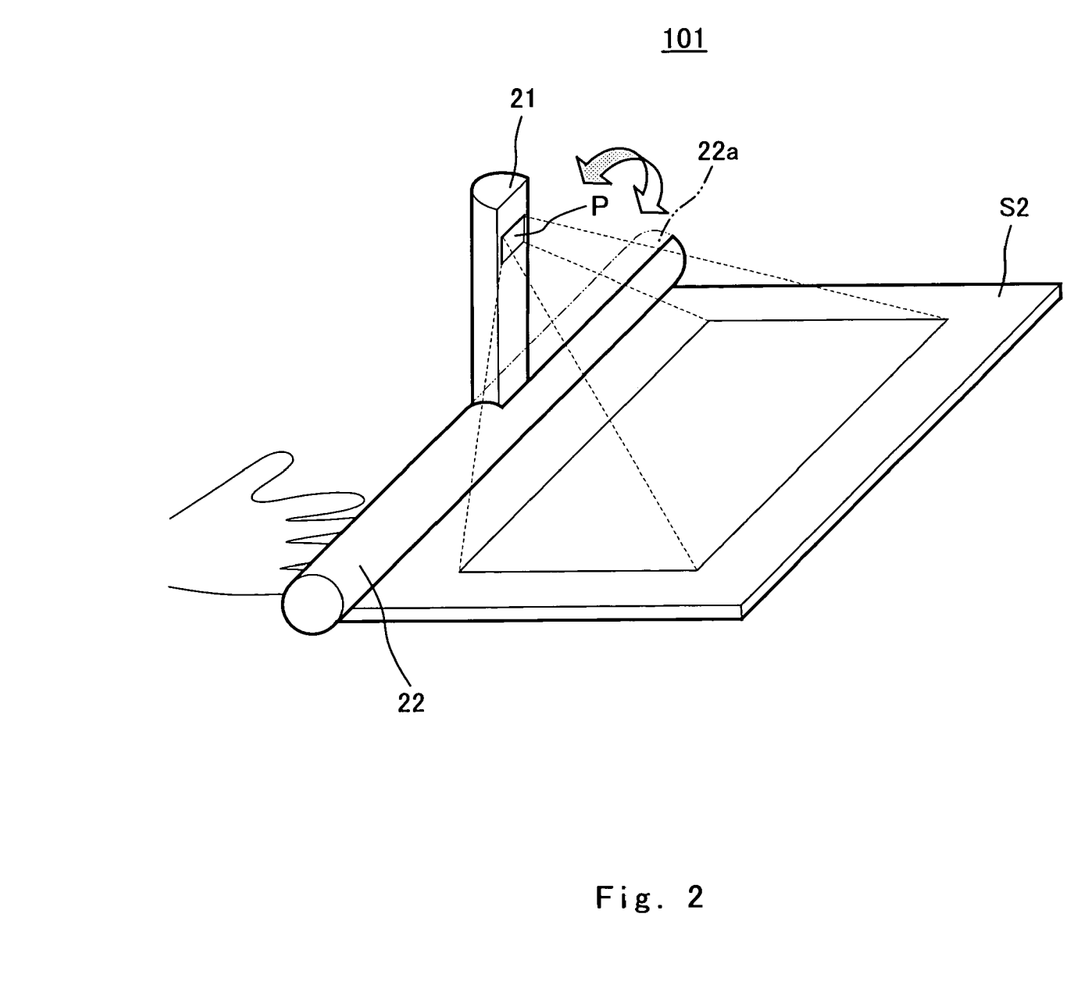
FIG. 2 is a perspective view schematically showing an appearance of a projection display apparatus according to Embodiment 2 of the present invention.

FIG. 2 is a perspective view schematically showing an appearance of a projection display apparatus according to Embodiment 2 of the present invention.

As can be understood from FIG. 2, a projection display apparatus 101 includes: a rectangular, flat screen S2 including a projection surface; a rod-like holding member 22 which is joined to the screen S2 by a suitable fixing means (not shown) along one side corresponding to a long side of the screen S2; and a rod-like, semi-cylindrical frame 21 which stores various components (projection device 8).

To be more specific, the holding member 22 has a substantially semi-cylindrical cutout region 22a which is a region cut along a longitudinal direction of the holding member 22 up to a substantially center portion of the holding member 22. Therefore, the holding member 22 has a cylinder shape between one end and the substantially center portion and a semi-cylinder shape between the substantially center portion and the other end.

The cutout region 22a is a step portion which is formed with respect to the holding member 22 and allows the semi-cylindrical frame 21 to fit therein. The step portion used herein is a generic term for various step regions each of which allows the frame 21 to fit therein, such as a cross-section cut region constructed like the cutout region 22a cut so as to correspond to the shape of the frame 21, a concave region (not shown) obtained by depressing the holding member 22 so as to correspond to the shape of the frame 21, etc.

The shape of a cutout cross section of the cutout region 22a is substantially the same as the shape of a flat surface (bottom surface) of the semi-cylindrical frame 21. Therefore, by causing the flat surface of the frame 21 to face and contact the cutout cross section of the holding member 22, the projection display apparatus 101 can be constructed compactly since the semi-cylindrical frame 21 and the semi-cylindrical portion of the holding member 22 form a substantially cylindrical member. Moreover, one end of the semi-cylindrical frame 21 in a longitudinal direction is fixed to the substantially center portion of the holding member 22 in the longitudinal direction (a portion in the vicinity of a base end portion of the semi-cylindrical portion of the holding member 22) via a suitable rotational supporting portion (for example, a hinge (not shown)). Thus, the frame 21 and the holding member 22 are joined to each other.

As shown by a solid line in FIG. 2, when using the projection display apparatus 101 in this state, the frame 21 swings around the rotational supporting portion such that the longitudinal direction of the frame 21 intersects with (is orthogonal to) the longitudinal direction of the holding member 22, and thus, the frame 21 is separated from the cutout region 22a (use position of the projection display apparatus 101). In this way, an appropriate projection distance is easily set between the frame 21 and the screen S2. As a result, the image light passing through the opening P provided on the flat surface of the frame 21 can be projected on the screen S2. In the present embodiment, since the optical axis of the image light passing through the opening P is inclined with respect to the normal line of the screen S2, the image light is subjected to so-called trapezoidal correction. That is, the image light is processed in advance by an optical system (a ratio of a vertical length and horizontal length of the image is changed) such that an image without distortion is displayed on the screen S2 in a state where the optical axis of the image light is inclined with respect to the normal line of the screen S2. Since the trapezoidal correction is well known, a detailed explanation thereof is omitted here.

Meanwhile, as shown by a chain double-dashed line in FIG. 2, when not using the projection display apparatus 101, the frame 21 swings such that the longitudinal direction of the frame 21 becomes in parallel with the longitudinal direction of the holding member 22, and thus, the frame 21 enters into the cutout region 22a (nonuse position of the projection display apparatus 101). In this way, the frame 21 perfectly fits in the cutout region 22a via a suitable fixing means (not shown).

To be specific, one end of the frame 21 in the longitudinal direction is swingably attached to the holding member 22, the frame 21 swings around this end of the frame 21 in the longitudinal direction, and the frame 21 moves between the nonuse position and use position of the projection display apparatus 101 so as to fit in or be separated from the holding member 22.

Thus, the portable projection display apparatus 101 constructed such that the position of the screen S2 follows the movement of the projection device is obtained.

First, the present inventor has prototyped a projection display apparatus which incorporates, in the frame 21 shown in FIG. 2, the projection device 8, the swinging detecting means 12, the correcting means 11 and the correcting means control device 9 which are the same as those explained in Embodiment 1 (FIG. 1). The same projection confirming experiment as Embodiment 1 was performed using this prototype, that is, the projection state of the projected image of the projection display apparatus was confirmed in a case where the prototype was turned on while being held in hand and the correction of the movement of the projected image by the swinging detecting means 12 (angular velocity sensors 12a and 12b) and the correcting means 11 was performed and in a case where the correction was not performed.

When the correction of the movement of the projected image by the swinging detecting means 12 (angular velocity sensors 12a and 12b) and the correcting means 11 was performed, the screen moves together with the swinging of the projection display apparatus being carried, whereas the projected image projected on the screen was stationary. As a result, the observer had uncomfortable feelings, like dizziness. For example, when a printed matter in hand is swung, contents (drawings, characters, etc.) printed on the printed matter inevitably swing, and the observer's eyes are naturally used to following the swinging printed matter and contents printed thereon.

Therefore, the observer seemed to feel that it was unnatural that when the position of the screen follows the movement of the projection device, only the projected image projected on the screen was stationary, and this brought the uncomfortable feelings, like dizziness, to the observer.

To be specific, unlike Embodiment 1 in which the position of the screen S1 (see FIG. 1) is fixed, regarding a case where, like the present embodiment, the position of the screen S2 (see FIG. 2) follows the movement of the projection device, when the correction of the movement of the projected image is not performed, the uncomfortable feelings of the projected image disappear. From this point of view, high-quality image can be said to be obtained.

However, in the case of developing further compact, lightweight projection display apparatuses, it is expected to become difficult to secure the stiffness between the projection device and the screen S2 in the projection display apparatus. In this case, there is a possibility that when the projection display apparatus is used while being carried, relative swinging (slight vibrations) between the projection device and the screen S2 caused due to the hand movement becomes non-negligible. Take the projection display apparatus 101 shown in FIG. 2 as an example. One end of the frame 21 is swingably attached to the holding member 22 by the suitable fixing means (hinge for example). Therefore, the stiffness between the frame 21 and the screen S2 is not high, and it is rather difficult to secure the stiffness therebetween due to the oscillation (play) of the fixing means. Therefore, the relative swinging between the projection device 8 and the screen S2 caused due to the hand movement may adversely affect the image quality of the projected image. In fact, the image blurring and the character blurring which seemed to be caused due to the affection of the swinging were observed when the correction of the movement of the projected image by the swinging detecting means 12 (angular velocity sensors 12a and 12b) and the correcting means 11 was not performed.

Comprehensively judging from the above results, the present inventor thought that it was necessary to invent a swinging detecting means capable of embodying a solution principle different from the technical idea of the swinging detecting means 12 explained in Embodiment 1.

Figure 3:
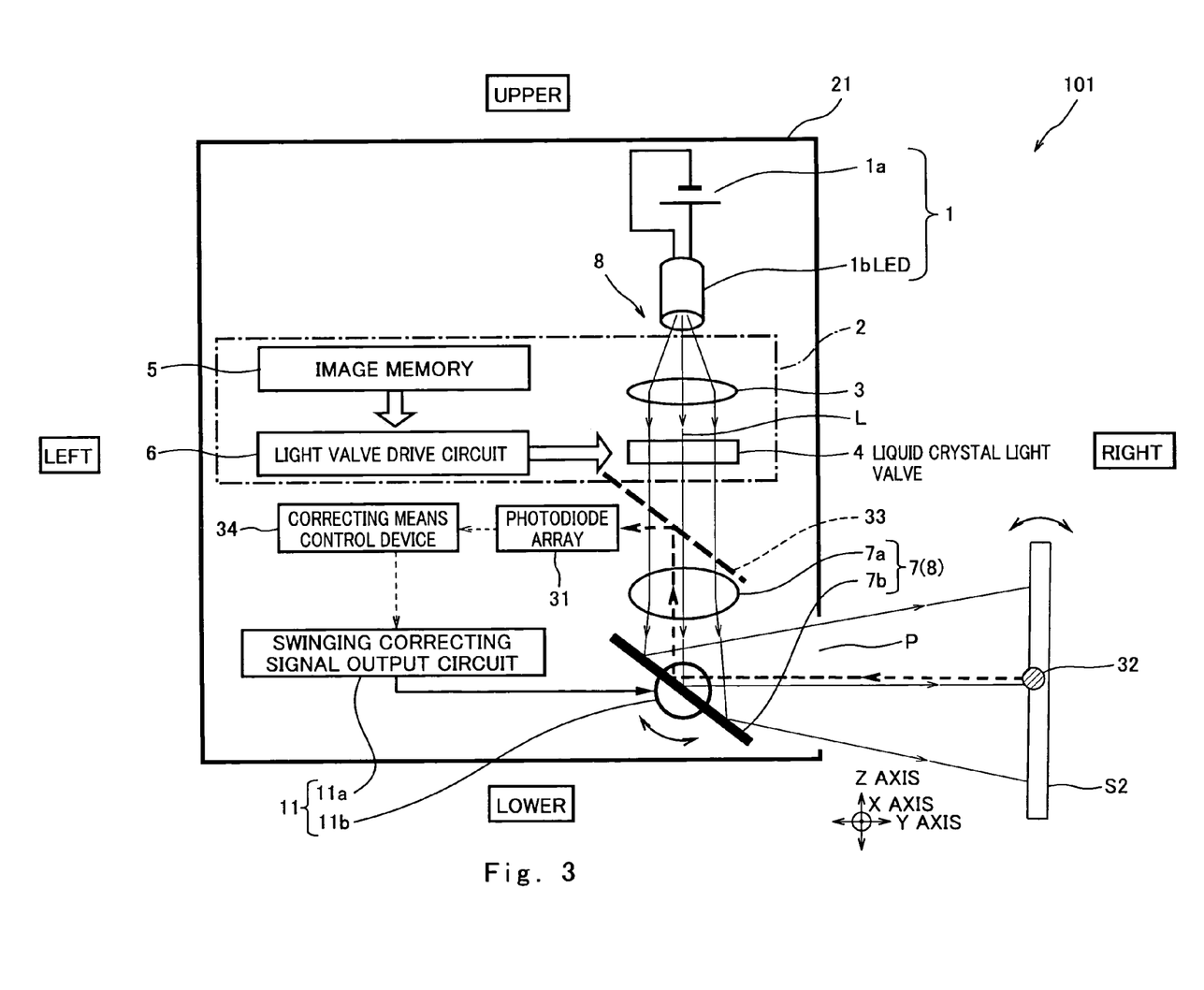
FIG. 3 is a block diagram showing one construction example of the projection display apparatus according to Embodiment 2.

FIG. 3 is a block diagram showing one construction example of the projection display apparatus according to the present embodiment. For convenience sake, the frame 21 and the screen S2 are spaced apart from each other in FIG. 3, as with FIG. 1. However, in fact, as shown in FIG. 2, the frame 21 and the screen S2 are joined to each other via the holding member 22.

Same reference numbers are used for components having the same constructions as the components explained in Embodiment 1, and detailed explanations thereof are omitted here.

In FIG. 3, instead of the quartz crystal tuning fork angular velocity sensors 12a and 12b, an infrared LED 32 (energy wave radiation source), an infrared reflection mirror 33 and a photodiode array 31 are provided as the swinging detecting means.

The infrared LED 32 is inconspicuously embedded in a center portion of the screen S2, and emits infrared (wavelength of 1 μm) whose intensity is adjusted to be normally distributed, within approximately ±30 degrees, centering around a center portion of the total reflection movable mirror 7b of the projection optical lens system 7.

The infrared reflection mirror 33 has a multilayer structure of dielectrics whose refractive indexes are different from each other, so as to be adjusted to reflect the infrared and allow visible light to pass therethrough. The infrared reflection mirror 33 is provided between the liquid crystal light valve 4 and the projection lens 7a, and is inclined at approximately 45 degrees with respect to the infrared when viewed from the X-axis direction.

The photodiode array 31 includes: 64 infrared photodiodes (not shown) arranged on a flat plane which is in parallel with the X-Z plane and has 8 rows (X-axis direction) and 8 columns (Z-axis direction); and a light-shielding plate (not shown) having small holes which are formed in front of respective photodiodes for allowing the infrared to pass therethrough. With this, chronological changes of an incident region of the infrared can be found out based on the positions of the photodiodes which have detected the infrared. Therefore, the relative swinging (slight vibrations) between the projection device 8 and the screen S2 caused due to the hand movement can be detected by the photodiode array 31. Of course, instead of the infrared photodiode, an infrared phototransistor or an infrared photonic IC may be used.

Next, operations of the projection display apparatus according to the present embodiment will be explained.

The operations of the projection display apparatus 101 other than the operation of detecting the swinging are the same as the operations of the projection display apparatus 100 explained in Embodiment 1, so that explanations of the common operations are omitted here.

As shown by a thick dotted line in FIG. 3, the infrared emitted from the infrared LED 32 in a Y-axis leftward direction is reflected by the total reflection movable mirror 7b so as to proceed in a Z-axis upward direction. After the infrared proceeding in the Z-axis upward direction passes through the projection lens 7b, it reaches the infrared reflection mirror 33 and is reflected again by an interference effect of the multilayer dielectrics of the infrared reflection mirror 33 so as to proceed in the Y-axis leftward direction. Finally, the infrared passes through the small holes of the light-shielding plate and is incident on the photodiode array 31.

The correcting means control device 34 repeatedly samples a matrix distribution of output values of the photodiode array 31 every predetermined period of time (Δt for example). Then, the correcting means control device 34 calculates, for example, a difference matrix $(N(t)(i, j) - N(t+\Delta t)(i, j))$ between an n-th matrix distribution output value $N(t)(i, j)$ (i=1 to 8, j=1 to 8) at a sampling point (t) and its subsequent ((n+1)-th) matrix distribution output value $N(t+\Delta t)(i, j)$ at a sampling point $(t+\Delta t)$.

Then, a straight line obtained by connecting coordinate corresponding to a maximum value of numerical values of the difference matrix $(N(t)(i, j) - N(t+\Delta t)(i, j))$ and coordinate corresponding to a minimum value of the numerical values of the difference matrix $(N(t)(i, j) - N(t+\Delta t)(i, j))$ is associated with a motion vector of the relative swinging between the projection device 8 and the screen S2 in this period (from t to $t+\Delta t$).

Next, the correcting means control device 34 divides the obtained motion vector into a component value of the Z-axis direction and a component value of the X-axis direction, multiplies each of the component values by a suitable coefficient, and supplies an output signal, corresponding to the angular velocity signal of Embodiment 1, to the swinging correcting signal output circuit 11a. Thus, the same correction as the correction of the movement of the projected image explained in Embodiment 1 is performed. As a result, the deterioration of the projected image caused due to the relative swinging between the projection device and the screen S2 is expected to become dissoluble.

The present inventor has prototyped a projection display apparatus which incorporates, in the frame 21 shown in FIG. 2, the projection device 8, the infrared reflection mirror 33 and the photodiode array 31 as the swinging detecting means, the correcting means 11 and the correcting means control device 34 which are shown in FIG. 3, and further incorporates, in the screen S2 shown in FIG. 2, the infrared LED 32 as the swinging detecting means. A projection confirming experiment was performed using this prototype, that is, the projection state of the projected image of the projection display apparatus was confirmed in a case where the prototype was turned on while being held in hand and the correction of the movement of the projected image due to the relative swinging between the projection device 8 and the screen S2 by the swinging detecting means 31, 32 and 33 and the correcting means 11 was performed and in a case where the correction was not performed.

Then, when the correction of the movement of the projected image was performed, the projected image swung together with the screen S2. Therefore, the uncomfortable feelings, like dizziness, occurred when the swinging of the projection device 8 itself was corrected were not occurred. In addition, the image blurring and the character blurring were improved and clear image quality could be obtained compared to when the correction of the movement of the projected image was not performed.

The infrared LED is described herein as one example of the energy wave radiation source provided on the screen S2. However, the present embodiment is not limited to this, and for example, any radiation source can be used as long as it emits an energy wave which does not adversely affect the projected image, sound or a human body, and any type and intensity of the radiation source can be selected suitably. Examples of such radiation source are an infrared laser, an ultrasound emission source, an electromagnetic wave (such as and an RF) emission source, and magnetism generating means, such as a magnet.

For example, in the case of using ultrasound or an electromagnetic wave, speed detection can be performed by Doppler effect. Based on this detected speed data, the relative swinging between the projection device 8 and the screen S2 can be detected.

Moreover, by providing a plurality of ultrasound (electromagnetic wave) elements at appropriate positions of the screen S2, causing an interference therebetween based on an electromagnetic wave source or an ultrasound source generated from these elements, and thereby generating a space distribution of the energy wave, the relative swinging between the projection device 8 and the screen S2 changes the amount of energy detected by an ultrasound (electromagnetic wave) sensor, and thus the relative swinging can be detected.

Further, by providing a magnet on the screen S2, the relative motion of the screen S2 with respect to the projection device 8 can be detected by a hall element provided on the projection device 8, and by an induction current of a coil.

Of course, plural kinds of energy wave radiation sources may be used together. For example, the electromagnetic wave and the infrared may be used together.

Modification Example 1

Embodiment 2 described the construction example in which the infrared LED 32 as the energy wave radiation source is provided on the screen S2. The following will explain, as a modification example of Embodiment 2, a construction example in which instead of providing the infrared LED 32 on the screen S2, an infrared laser 36 of the same type is provided inside the frame 21 storing the projection device 8.

Except that the installation location of the infrared laser 36 is changed from that of Embodiment 2, the constructions and operations of the present modification example are the same as those of Embodiment 2, so that explanations of those common constructions and operations are omitted here.

Figure 4:
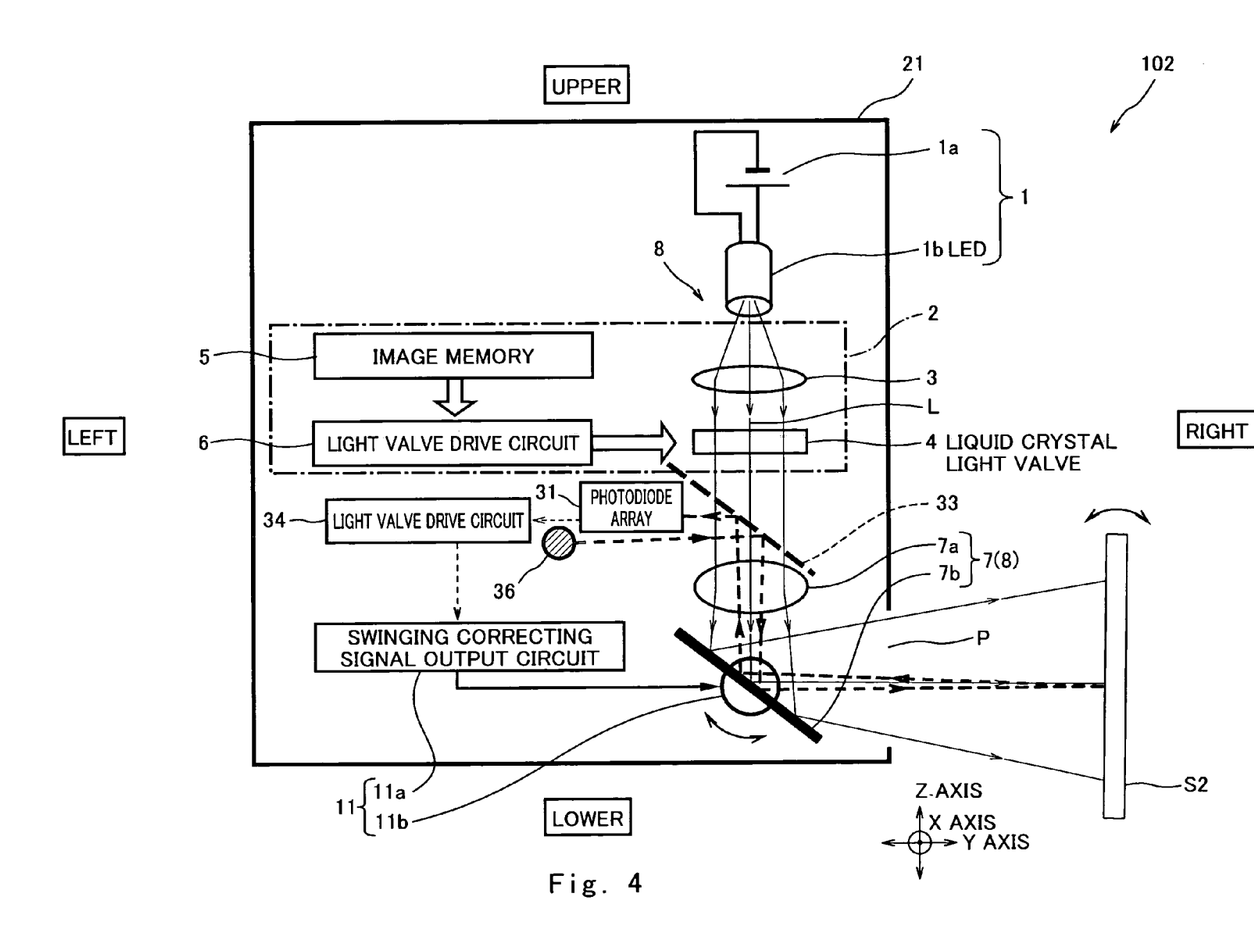
FIG. 4 is a block diagram showing one construction example of a projection display apparatus according to Modification Example 1.

FIG. 4 is a block diagram showing one construction example of a projection display apparatus according to the present modification example.

In FIG. 4, the infrared laser 36 provided at an appropriate position inside the frame 21 (for example, on the wall of the frame 21) emits, toward the screen S2 (to be exact, via the infrared reflection mirror 33 and the total reflection movable mirror 7b) the infrared (wavelength of 1 μm) whose intensity is adjusted to be normally distributed within approximately ±30 degrees. With this, as with Embodiment 2, the energy wave of the infrared reflected from the screen S2 can be detected by the photodiode array 31.

Next, operations of the projection display apparatus according to Modification Example 1 will be described.

As shown by a thick dotted line in FIG. 4, the infrared emitted from the infrared laser 36 along the Y-axis rightward direction is reflected by the interference effect of the multilayer dielectrics of the infrared reflection mirror 33 so as to proceed in the Z-axis downward direction. After the infrared proceeding in the Z-axis downward direction passes through the projection lens 7b, it reaches the total reflection movable mirror 7b and is reflected by the total reflection movable mirror 7b so as to proceed in the Y-axis rightward direction again, and is incident on the screen S2. Then, as shown by a thick dotted line in FIG. 4, the energy wave of the infrared reflected by the screen S2 along the Y-axis leftward direction goes back the course it has come, that is, the energy wave is reflected by the total reflection movable mirror 7b so as to proceed in the Z-axis upward direction, and then, the energy wave of the infrared proceeding in the Z-axis upward direction passes through the projection lens 7b, reaches the infrared reflection mirror 33, is reflected by the interference effect of the multilayer dielectrics of the infrared reflection mirror 33 so as to proceed in the Y-axis leftward direction again, and finally passes through the small holes of the light-shielding plate and is incident on the photodiode array 31.

In accordance with the projection display apparatus according to the present modification example, as with Embodiment 2, when the correction of the movement of the projected image was performed, the projected image swung together with the screen S2. Therefore, the uncomfortable feelings, like dizziness, occurred when the swinging of the projection device 8 itself was corrected were not occurred. In addition, the image blurring and the character blurring were improved and clear image quality could be obtained compared to when the correction of the movement of the projected image was not performed.

Embodiment 3

As shown in FIG. 2, Embodiment 2 explained the projection display apparatus 101 in which the screen S2 and the frame 21 are integrally joined to each other. However, it is not necessary to integrally join the screen S2 and the frame 21. Embodiment 3 of the present invention explains, as a modification example of Embodiment 2, a construction example in which the frame storing the projection device and the screen are provided separately.

Figure 5:
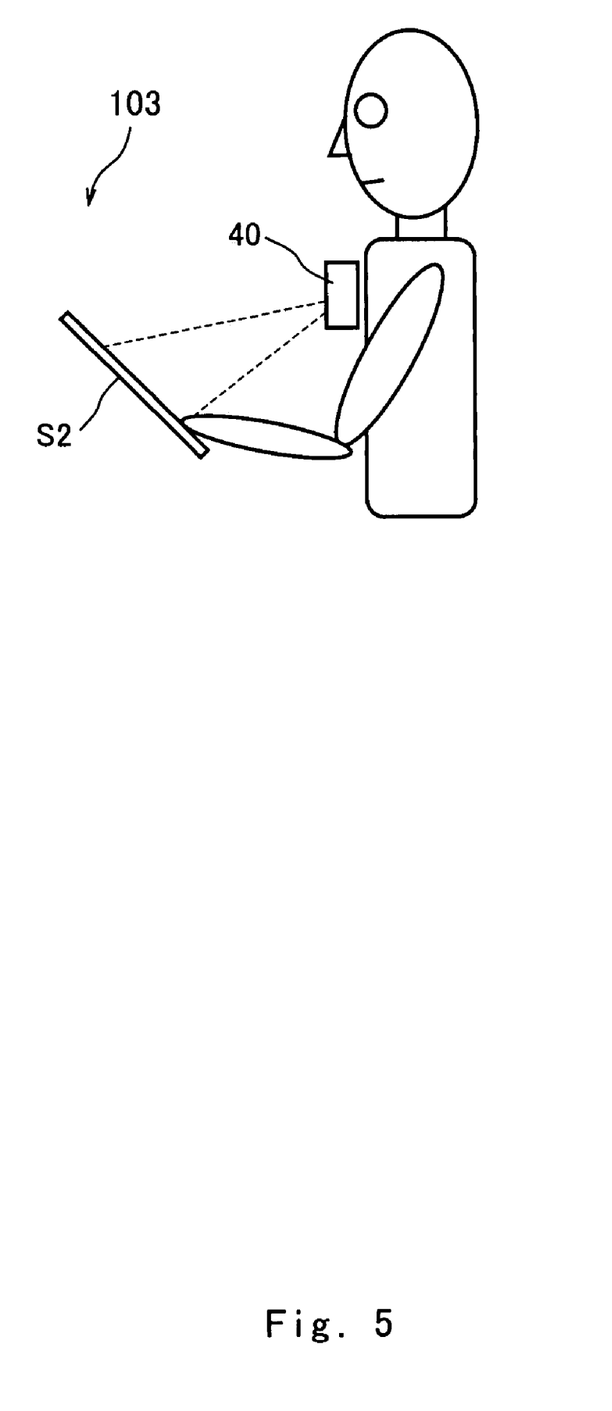
FIG. 5 is a schematic diagram showing an outline of one construction example of a projection display apparatus according to Embodiment 3 of the present invention.
Figure 6:
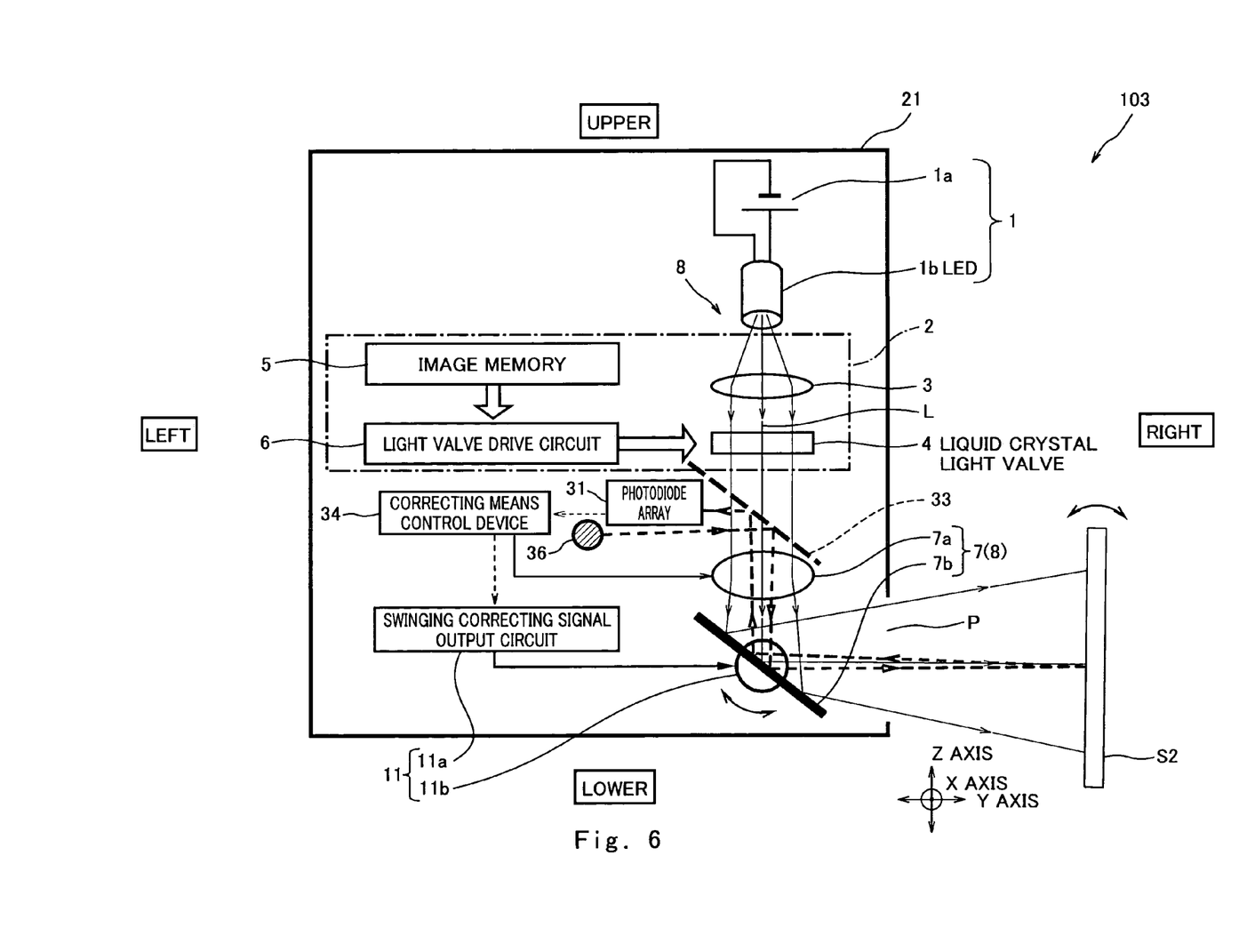
FIG. 6 is a block diagram showing one construction example of the projection display apparatus of FIG. 5.
Figure 7:
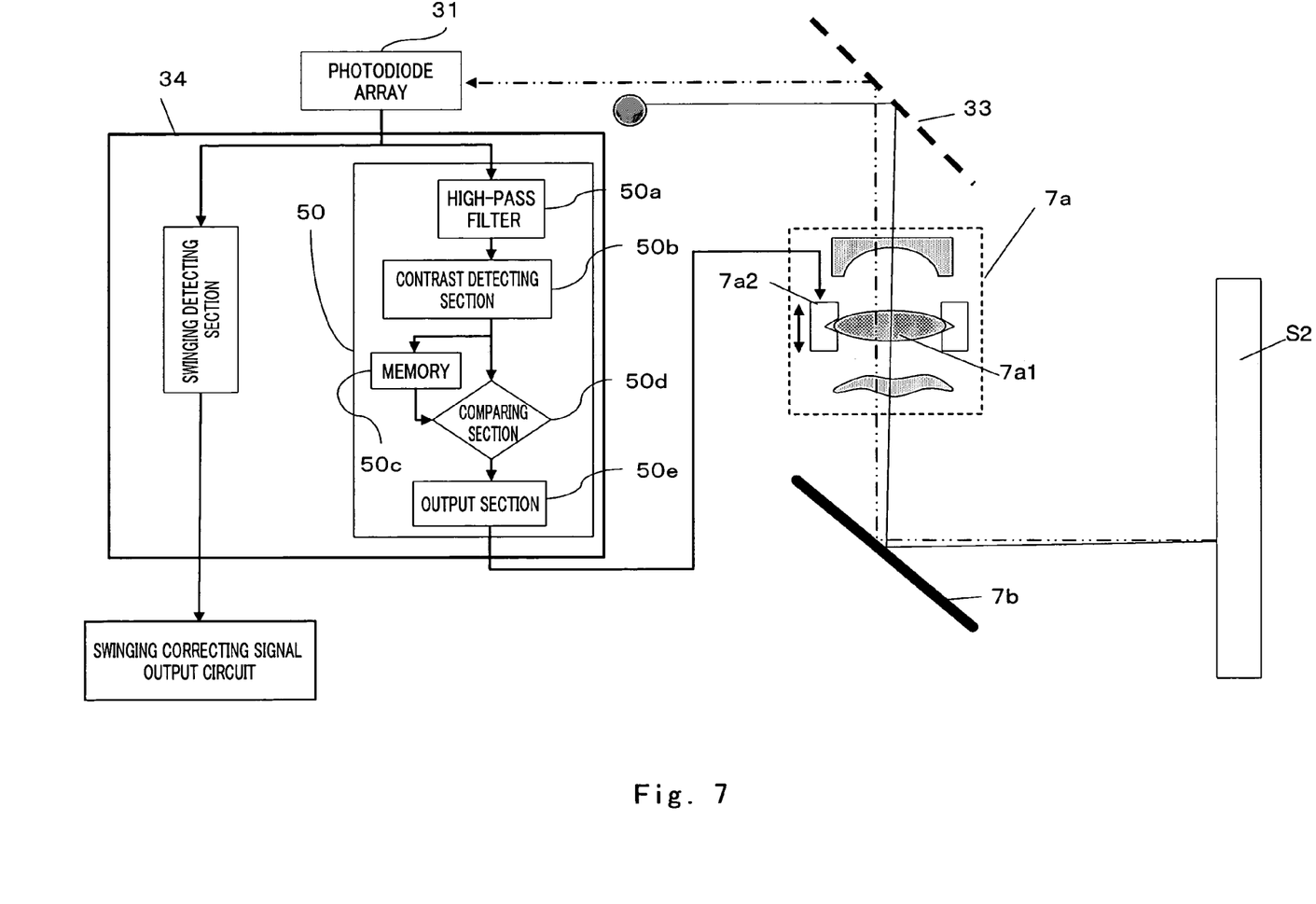
FIG. 7 is a block diagram showing details of an important portion of the block diagram of FIG. 6.

FIG. 5 is a schematic diagram showing an outline of one construction example of a projection display apparatus according to the present embodiment. FIG. 6 is a block diagram showing one construction example of the projection display apparatus of FIG. 5. FIG. 7 is a block diagram showing details of an important portion of the block diagram of FIG. 6. In FIGS. 5 to 7, same reference numbers are used for components that are the same as or correspond to the components in FIG. 4, and explanations thereof are omitted here.

A projection display apparatus 103 of the present embodiment includes the screen S2 (such as paper) in the form of a thin sheet held by a hand of an observer and a frame 40 which is separated from the screen S2, is attached to a chest of a clothing of the observer and stores the projection device 8.

As shown in FIG. 6, the frame 40 includes therein various components (the projection device 8, the infrared reflection mirror 33 and photodiode array 31 as the swinging detecting means, the correcting means 11, and the correcting means control device 34) explained in Embodiment 2 (FIG. 3) or various components (the projection device 8, the infrared laser 36, infrared reflection mirror 33 and photodiode array 31 as the swinging detecting means, the correcting means 11, and the correcting means control device 34) explained in Modification Example 1 (FIG. 4).

The constructions and operations of these components are the same as those explained in Embodiment 2 and Modification Example 1, so that explanations of those constructions and operations are omitted here.

In accordance with the projection display apparatus 103, when a device attached to the chest of the clothing is activated at the time of using the projection display apparatus 103, the projected image is displayed on the screen S2, and at the time of not using the projection display apparatus 103, the frame 40 is worn around a neck of the observer or is stored in a bag, so as to be carried separately from the screen S2.

In the projection display apparatus 103 according to the present modification example, the projection distance between the projection device 8 and the screen S2 is not fixed. Therefore, the projection display apparatus 103 needs to have something like an autofocus function or a projection position determining function. Here, using an infrared ink which absorbs the infrared and is transparent (that is, invisible) with respect to the visible light, marking thin lines constituted of bar code thin lines (not shown) or a plurality of concentric circular thin lines (not shown) which become black lines with respect to the infrared are provided at appropriate positions on the surface of the screen S2.

Then, when the infrared illuminates the marking thin lines formed on the screen S2 by a suitable infrared LED or infrared laser (for example, the infrared laser 36 of the frame 21 shown in FIG. 4), a predetermined characteristic (for example, bar code information in the case of the bar code thin lines) is given to the energy wave of the infrared reflected by the screen S2, and this energy wave is supplied to the photodiode array 31 (to be exact, via the infrared reflection mirror 33 and the total reflection movable mirror 7*b*).

Then, based on the energy wave of the infrared incident on the photodiode array 31, the photodiode array 31 in which the photodiodes are arrange in a matrix manner (8 rows and 8 columns) detects a status signal of the marking thin lines (in the case of the bar code thin lines for example, a status signal indicating whether or not bar code information of the marking thin lines can be obtained by a bar code reader (not shown) by detecting respective marking thin lines). Then, the status signal of the marking thin lines is supplied to the correcting means control device 34 as a signal for determining projection positions of the projection device 8 and the screen S2 or as a signal indicating a focus status regarding the projection device 8 and the screen S2. Therefore, by the correcting means control device 34, appropriate projection positions of the projection device 8 and the screen S2 can be determined, and the focus regarding the projection device 8 in the projection optical lens system 7 and the screen S2 can be adjusted automatically. Specifically, in the present embodiment, an automatic focus adjustment is performed by utilizing a contrast between the marking thin lines and its background (the surface of the screen 2). Hereinafter, this automatic focus adjustment mechanism will be explained in detail. In FIG. 7, the correcting means control device 34 includes an automatic focus adjustment section 50, in addition to a swinging detecting section for correcting the above-described swinging. The automatic focus adjustment section 50 includes a high-pass filter 50*a*, a contrast detecting section 50*b*, a memory 50*c*, a comparing section 50*d* and an output section 50*e*. Moreover, a lens 7*a*1 that is a part of the projection lens 7*a* is moved by a motor (not shown) in two directions that are a forward direction and backward direction of a direction (Z-axis direction) along an optical axis of the projection lens 7*a*, and the motor rotates at a speed corresponding to an output current from the output section 50*e*. In the automatic focus adjustment mechanism thus constructed, the infrared (infrared light) emitted from the infrared laser 36 passes through the projection lens 7*a* and reflected by the marking thin line of the screen 2, and the reflected light passes through the projection lens 7*a* in an opposite direction and is received by the photodiode array 31. At this time, high and low intensities of the reflected light in a cross-sectional direction are generated by the marking thin lines of the screen S2, and the intensity of the reflected light received by the photodiode array 31 is distributed by the high and low intensities. The reflected light having this intensity distribution is converted by the photodiode array 31 into a light receiving signal (electric signal). The light receiving signal is output from the photodiode array 31 and supplied to the swinging detecting section. Moreover, the light receiving signal is also supplied to the high-pass filter 50*a*, and at this time, high frequency component that is a contour of the light receiving signal is taken out. Then, regarding the taken-out high frequency component, the contrast detecting section 50*b* detects the contrast from an intensity ratio corresponding to the above-described high and low intensities. The contrast is low when the projection lens 7*a* defocuses (does not focus on the screen 2), and the contrast is the highest when the projection lens 7*a* focuses on the screen S2 the most. The contrast is supplied to the memory 50*c* and the comparing section 50*d*. The memory 50*c* stores the supplied contrast until the next sampling period (the stored contrast is updated by the next contrast). The comparing section 50*e* compares the currently supplied contrast with the contrast, stored in the memory 50*c*, of the previous sampling period, so as to calculate a temporal change of the contrast and outputs a current corresponding to this change to the above-described motor. Then, the motor causes the lens 7*a*1 that is a part of the projection lens 7*a* to move at the rotating speed corresponding to this output current. Thereby, the focus of the projection lens 7*a* is changed (the focus is changed so that the above-describe temporal change of the contrast becomes small). Thus, the focus of the projection lens 7*a* is feedback-controlled by detecting the contrast of the reflected light of the infrared emitted from the infrared laser 36. In accordance with this feedback control, when the degree of defocus of the projection lens 7a increases, the temporal change of the contrast calculated by the comparing section 50e increases, and the focus of the projection lens 7a changes largely (quickly), whereas when the degree of defocus of the projection lens 7a decreases, the temporal change of the contrast calculated by the comparing section 50e decreases, and the focus of the projection lens 7a changes slightly (slowly). When the projection lens 7a comes into focus, the temporal change of the contrast calculated by the comparing section 50e becomes zero, and the focus of the projection lens 7a stops changing. Therefore, the focus of the projection lens 7a is adjusted automatically.

As above, in accordance with the present embodiment, the frame 40 storing the projection device and the screen S2 are formed separately, and while the focus of the projection device is adjusted automatically on the screen S2, and a swinging correcting mechanism cancels the relative swinging between the projection device and the screen S2, the image projected on the screen S2 by the projection device can be observed. Therefore, it is possible to realize a portable projection display apparatus which can suppress the image distortion caused due to the relative swinging between the projection device and the screen S2.

In Embodiments 2 and 3, the infrared is described as one example of the energy wave. However, the present embodiment is not limited to this, and for example, any type of the energy wave can be selected suitably as long as it does not adversely affect the projected image, sound or a human body. Examples of such energy wave are electromagnetic wave and ultrasound.

Moreover, the marking thin lines (marking thin lines drawn using the infrared ink when the energy radiation source is the infrared) that are the bar code thin lines or the concentric circular thin lines may be provided at a substantially center portion of the screen S2.

Then, when the main power of the projection device 8 is turned on, and the energy radiation source (the infrared laser 36 of the frame 21 for example) keeps emitting the energy wave, the correcting means control device 34 can easily find out the appropriate projection position (position where a projection center of the projection device 8 coincides with the center of the screen) of the screen S2 based on whether or not the energy wave which has hit the marking thin lines and returned is detected. Then, when the operations of the swinging detecting means and the correcting means 11 are automatically started after the screen S2 moves to the appropriate projection position, and the projection positions of the projection device 8 and the screen S2 and the projection distance between the projection device 8 and the screen S2 are set to a substantially initial state capable of performing the projection operation by the projection display apparatus, it is possible to keep displaying the image at the center portion of the screen S2 while achieving the effect of the correction of the movement of the swinging based on the swinging detecting means and the correcting means 11, which is preferable. Of course, the swinging detecting means and the correcting means 11 may be activated manually by the observer (switching a suitable switching means).

Moreover, in Embodiments 1 to 3, the image forming means 2 is constituted of the liquid crystal light valve 4 which does not emit light, and the light emitting means 1 is provided. However, the image forming means may be constituted of an element which emits light, such as an EL display element. In this case, the light emitting means 1 can be omitted.

From the forgoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The present invention can suppress the projected image distortion caused due to the relative swinging of the projection device with respect to the projection surface, and is applicable to, for example, a portable projection display apparatus.

The invention claimed is:

1. A portable projection display apparatus comprising:
a screen having a projection surface;
a projection device including an image forming means for forming image light and a projection optical lens system which projects the image light, obtained by the image forming means, toward the projection surface such that the projection optical lens system is able to change a projection direction of the image light;
a swinging detecting means for detecting a relative swinging of the projection device with respect to the projection surface based on an energy wave which arrives from the projection surface by passing through the projection optical lens system and does not adversely affect the image light; and
a correcting means for correcting the projection direction of the projection optical lens system in accordance with an output value of the swinging detecting means, so as to cancel a relative movement of the image light in the projection direction that is caused by the swinging,
wherein the swinging detecting means includes a radiation source which is stored in the projection device for emitting the energy wave and a sensor which detects the energy wave which is emitted from the radiation source, passes through the projection optical lens system, is projected on the projection surface, is reflected by the projection surface, passes through the projection optical lens system and is incident on the sensor, and the swinging detecting means detects the relative swinging of the projection device with respect to the projection surface based on the energy wave detected by the sensor,
the projection surface is provided with a marking which gives a predetermined characteristic to the energy wave reflected by the projection surface based on an interaction between the marking and the energy wave, and
the optical lens system is configured to be able to adjust a focus of the projected image light,
the portable projection display apparatus further comprising an automatic focus adjusting means for detecting a focus status of the optical lens system based on the energy wave which is detected by the sensor of the swinging detecting means and to which the predetermined characteristic is given, and for adjusting the focus of the optical lens system based on the focus status.

2. The projection display apparatus according to claim 1, wherein the swinging detecting means detects a relative swinging occurred between the projection device and the projection surface in a state where the projection surface is not fixed to the projection device.

3. The projection display apparatus according to claim 1, wherein the swinging detecting means detects a status signal of the marking based on the energy wave to which the predetermined characteristic is given, and determines projection positions of the projection device and the projection surface based on the status signal.

4. The projection display apparatus according to claim 1, further comprising a light emitting means,
   wherein the image forming means forms the image light based on light emitted from the light emitting means.

5. The projection display apparatus according to claim 1, wherein the energy wave is infrared.

6. The projection display apparatus according to claim 1, wherein the marking is formed at a region of the projection surface on which the image light is projected.

7. The projection display apparatus according to claim 6, wherein the marking is formed at a substantially center portion of the projection surface.

8. The projection display apparatus according to claim 1, wherein the predetermined characteristic given by the marking includes both information of projection positions of the projection device and the projection surface and information of a focus status of the optical lens system.

9. The projection display apparatus according to claim 8, wherein the marking is a bar code thin line or a concentric circular thin line.

* * * * *